(12) United States Patent
D'Albore et al.

(10) Patent No.: US 7,424,570 B2
(45) Date of Patent: Sep. 9, 2008

(54) METHOD FOR PATCHING ROM INSTRUCTIONS IN AN ELECTRONIC EMBEDDED SYSTEM INCLUDING AT LEAST A FURTHER MEMORY PORTION

(75) Inventors: Guido D'Albore, Caserta (IT); Pasquale Vastano, Santa Maria Capua Vetera (IT)

(73) Assignee: Incard SA, Geneva (CH)

( * ) Notice: Subject to any disclaimer, the term of this patent is extended or adjusted under 35 U.S.C. 154(b) by 443 days.

(21) Appl. No.: 10/820,462

(22) Filed: Apr. 8, 2004

(65) Prior Publication Data
US 2005/0228959 A1 Oct. 13, 2005

(51) Int. Cl.
*G06F 12/00* (2006.01)
(52) U.S. Cl. .................. 711/102; 711/159
(58) Field of Classification Search .......... 711/102
See application file for complete search history.

(56) References Cited

U.S. PATENT DOCUMENTS

| | | | | |
|---|---|---|---|---|
| 6,536,038 B1* | 3/2003 | Ewertz et al. | ............... | 717/168 |
| 2003/0084229 A1* | 5/2003 | Ho et al. | ............... | 711/102 |
| 2003/0196051 A1* | 10/2003 | Mahria | ............... | 711/159 |
| 2004/0128471 A1* | 7/2004 | Oakley et al. | ............... | 711/220 |
| 2004/0210720 A1* | 10/2004 | Wong et al. | ............... | 711/132 |

* cited by examiner

*Primary Examiner*—Matt Kim
*Assistant Examiner*—Shane M. Thomas
(74) *Attorney, Agent, or Firm*—Lisa K. Jorgenson; Allen Dyer Doppelt Milbrath & Gilchrist

(57) ABSTRACT

A mechanism for patching read only memory (ROM) instructions in an embedded system is provided. The embedded system includes non-volatile memory such as a ROM, a RAM and an EEPROM. In one configuration, the ROM contains application modules (subroutines) that are subordinate to a flag status. The flag status indicates to the subroutine whether to execute the ROM instructions in the ROM or the extended instructions in the EEPROM. The instructions in the EEPROM may be used to patch or to extend the behaviors masked in the ROM instructions. The extended instructions in the EEPROM may reuse the ROM instructions in the ROM without resulting in recursive actions.

26 Claims, 3 Drawing Sheets

METHOD FOR PATCHING ROM INSTRUCTIONS IN AN ELECTRONIC EMBEDDED SYSTEM INCLUDING AT LEAST A FURTHER MEMORY PORTION

FIELD OF THE INVENTION

The present invention relates to a method for patching read only memory (ROM) instructions in an electronic embedded system that includes an additional memory portion. The additional memory portion may be a ROM, a RAM, an EEPROM or other non-volatile memory devices. The electronic embedded system may be a CPU based system, for example.

The electronic embedded system may be incorporated into an electronic device, such as a terminal of a wired or wireless communication system that includes a plurality of nodes structured to receive and transmit signals among the terminals. The embedded electronic device may be a personal digital assistant (PDA) or a mobile telephone including an IC-card with resident applications stored in the ROM portion. The invention further relates to such an electronic device, and to an IC-card used in such a device.

BACKGROUND OF THE INVENTION

Embedded systems based on a read only memory program are equipped with a non-volatile memory potion, for instance an electrically erasable and programmable read only memory (EEPROM) that is used for customized data. These embedded systems are incorporated into portable electronic devices such as handhelds, mobile phones, IC-cards, etc. Such devices operate according to a program (software application) masked on the read only memory that defines its functionalities.

The manufacturers, before making available a product based on the masked ROM device, stores customized data and user data into a non-volatile memory portion. As an example, consider the case of an IC-card for a GSM application. The telecommunication operators or providers require as much space as possible for the manufactures of the IC-card in terms of memory space of the non-volatile memory portion. Such space is used for the user data (i.e., address book, SMS, etc.) as well as for their own customized data from the provider (i.e., special operator functionalities, proprietary authentication algorithms, etc.). Generally speaking, the more non-volatile memory space is available the more attractive the final product is from a marketing point of view.

Moreover, since there is often the need to change or fix the ROM software functionalities without re-masking, it would be very important to have an efficient extending or patching mechanism for hooking new instructions to the ROM for picking them up from the non-volatile memory portion.

To extend or patch the ROM functionalities, the masked program needs to be sensitive to the patching mechanisms. According to the prior art, these mechanisms are based on the principle of replacing groups of masked ROM instructions, also known as subroutines, with new set of instructions. In other words, a new subroutine is stored in the additional non-volatile memory portion (e.g., EEPROM, Flash, etc.). This approach, however, suffers two problems. One problem is that the new subroutine stored in the non-volatile memory portion cannot reuse the calling ROM subroutine. A second problem is that it is not possible to reuse the ROM subroutine since the size of an EEPROM subroutine will be as large as the size of ROM subroutine that needs to be replaced.

FIG. 1 is a schematic and simplified view showing how the common patching mechanism of the prior art works. As may be appreciated, during execution of a ROM subroutine there might be a call to the EEPROM subroutine to be executed in place of the ROM instructions. However, after having executed the EEPROM instructions there is no possibility to reuse the ROM instructions without causing a recursive endless action.

SUMMARY OF THE INVENTION

In view of the foregoing background, an object of the present invention is to provide a mechanism for patching ROM instructions in an electronic embedded system, for instance a CPU based system, including at least one additional memory portion.

Another object of the present invention is to provide a method for patching ROM instructions based on the criteria that the ROM subroutines may be reusable.

A further object of the present invention is to allow the call and execution of EEPROM instructions having also the possibility to reuse the calling ROM instructions without incurring in a recursive endless action.

An embodiment of the invention provides a method for patching or extending ROM instructions in an electronic embedded system, for instance a CPU based system, including a first read only memory portion, an extended memory portion and an additional memory portion. Instructions groups, such as subroutines or software modules, defining the patching functionalities of the system are contained in the read only memory portion while extended instructions are stored in the extended memory portion. The processing of the subroutines or instructions of the first read only memory portion is alternated by a checking phase of the logic value of corresponding flags stored in the additional memory portion indicating the need of executing subroutine instructions in the extended memory portion.

Another embodiment of the invention provides for an electronic embedded system structured to implement the inventive method, and including at least a memory portion storing logic values of corresponding flags indicating the need of executing subroutine instructions stored in main or extended memory portions.

BRIEF DESCRIPTION OF THE DRAWINGS

The features and advantages of the method and system according to the present invention will become apparent from the following description of an embodiment thereof, given by way of non-limiting examples with reference to the accompanying drawings.

DETAILED DESCRIPTION OF THE PREFERRED EMBODIMENTS

Figure 1:
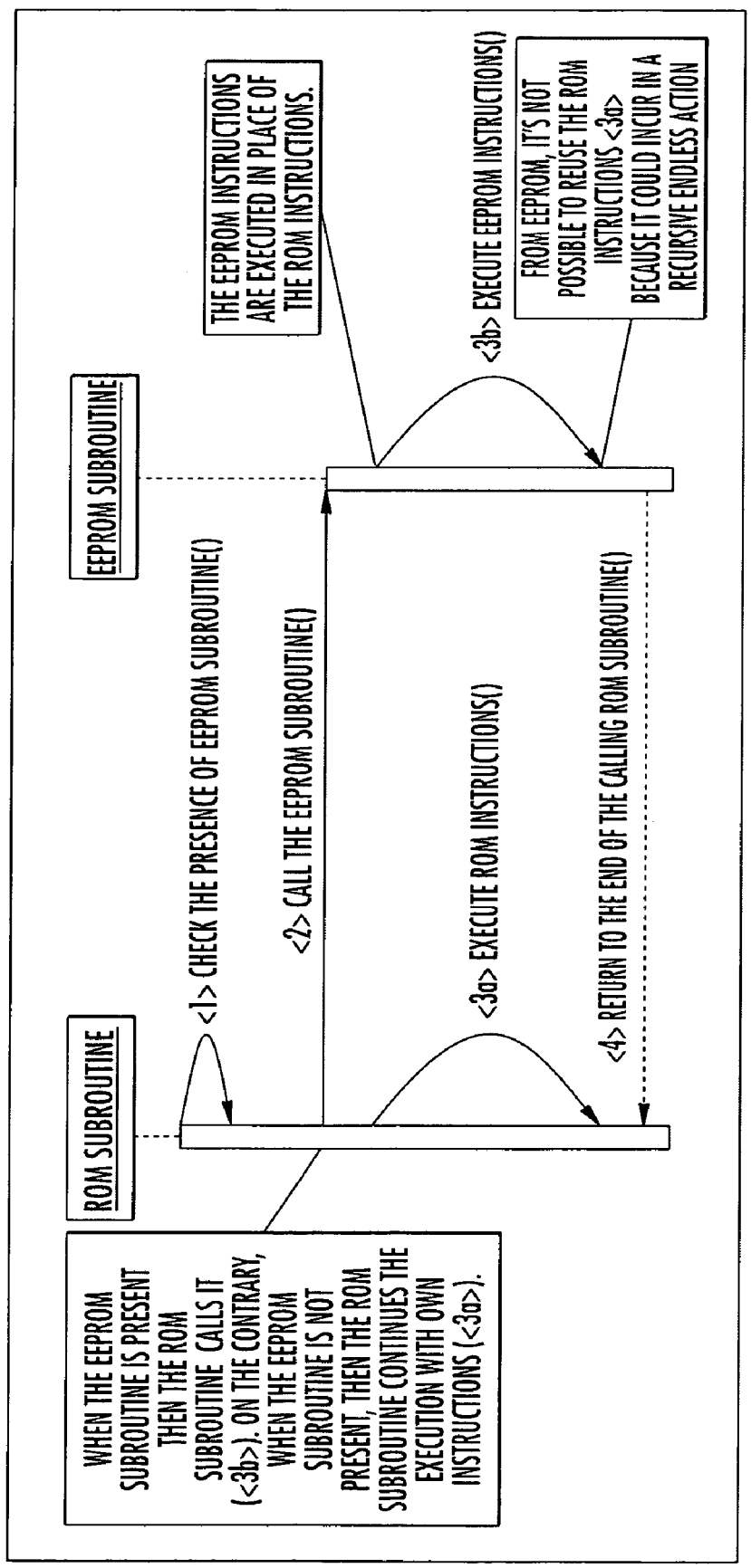
FIG. 1 is a schematic and simplified view showing a common patching mechanism according to a prior art method.
Figure 2:
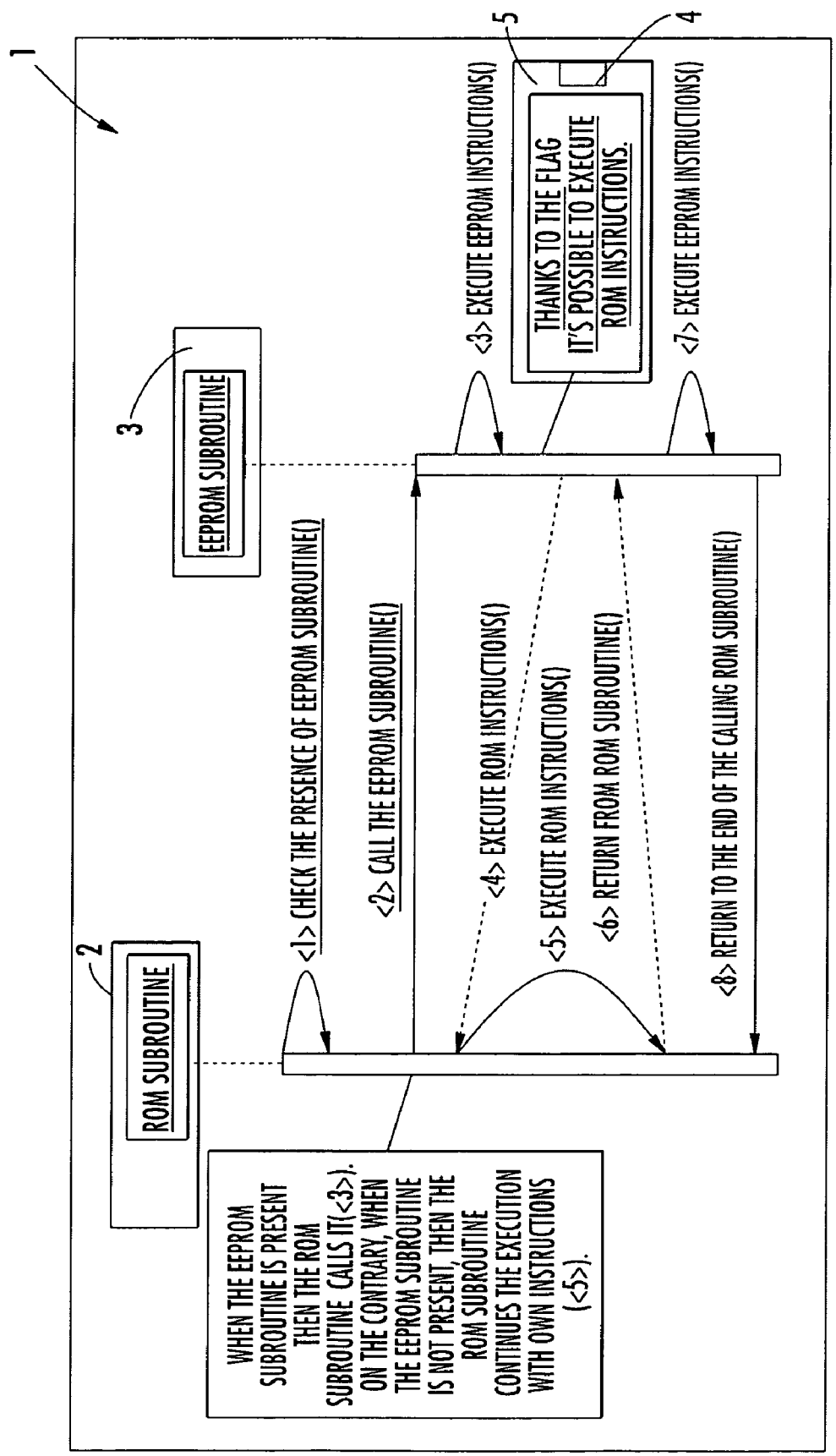
FIG. 2 is a schematic and simplified view showing a patching mechanism based on the method of the present invention.

With specific reference to the view of FIG. 2, an electronic embedded system, for instance a CPU based system, is schematically shown at 1. According to the invention, the system 1 includes at least a first read only memory (ROM) portion 2, a second extended memory portion 3, and at least an additional memory portion 5. The first memory portion 2 may be an electrically erasable memory portion of the EEPROM or Flash type.

The second and extended memory portion 3 of the system 1 is a non-volatile memory, for instance an EEPROM, including subroutines, extended instructions and or data. The additional memory portion 5 may be structurally and functionally independent from both the first read only memory portion 2 and the extended memory portion 3, and may be a read/write memory such as a volatile RAM. As an alternative, the additional memory portion 5 may be an EEPROM or another non-volatile memory device.

The invention makes use of microprocessor instructions groups, called a subroutine or a software module, which defines the patching functionalities, and to the data contained in the memory portions 3 and 5.

Figure 3:
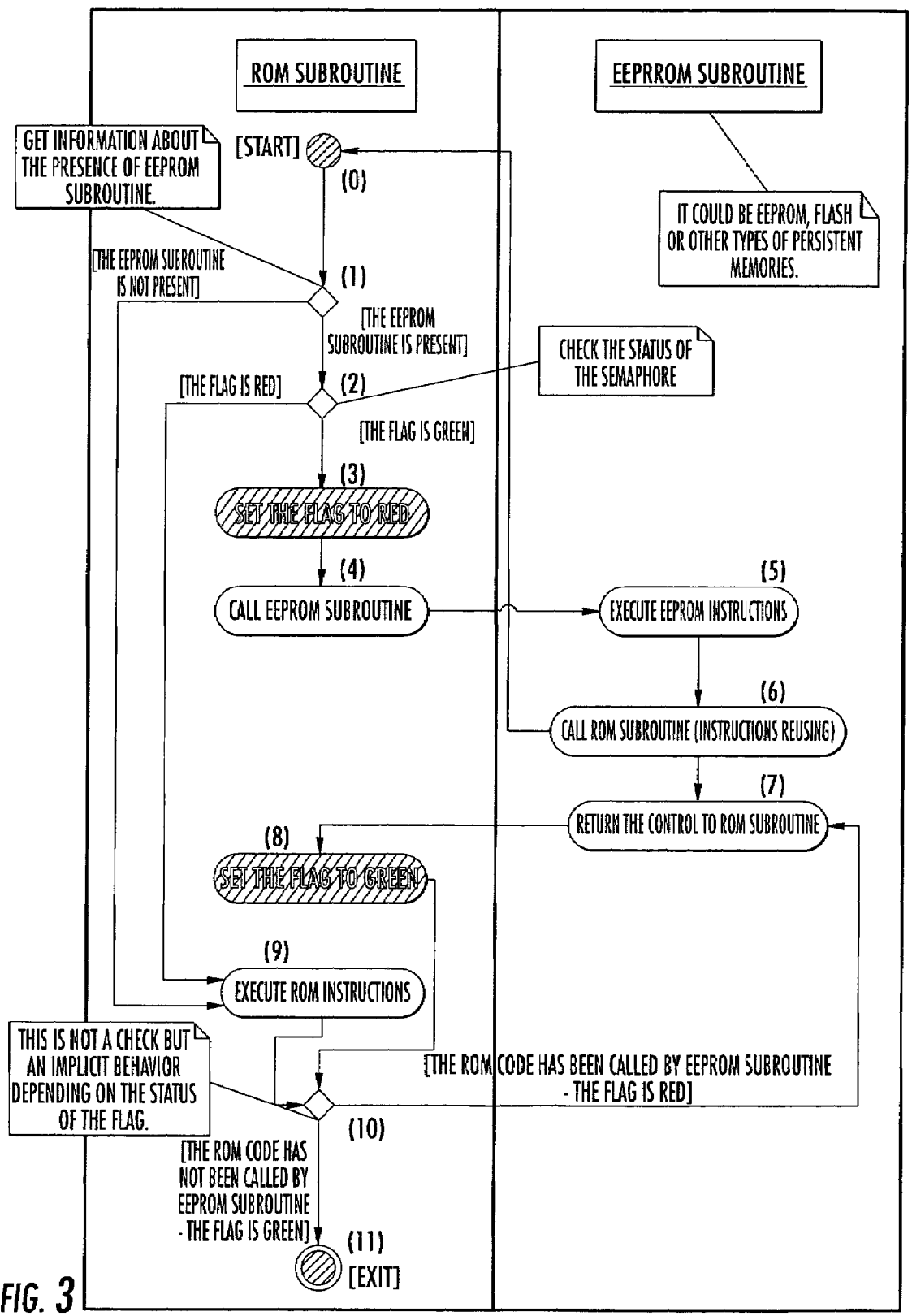
FIG. 3 is a scheme about the patching mechanism of the invention showing how the subroutines work together as well as their operational sequence.

FIG. 3 shows a schematic flow chart of the possible evolution of the patching mechanism according to the present invention. The ROM portion 2 stores ROM instructions and subroutines that are executed according to a predetermined software algorithm.

In such a configuration, the ROM portion 2 contains many application modules (or subroutines) which are subordinate to a flag or semaphore 4 status stored in the additional memory portion 5.

The flag indicates to the subroutine whether or not to execute their own ROM instructions or the subroutine instructions of the extended memory portion 3, for instance EEPROM based subroutine instructions. The EEPROM based subroutine instructions may be used to patch or to extend the behaviors masked (unchangeable) in the instructions of the ROM portion 2. Furthermore, the EEPROM based subroutine may reuse the ROM based subroutine without incurring in recursive actions.

Thus, differently from conventional mechanisms, the present invention provides a patching mechanism based on the application of flags 4 placed in the read/write additional memory portion 5, in which the ROM subroutine controls its own execution. With the help of these flags, the ROM subroutines may know whether and when it is possible to call an EEPROM subroutine without resulting in recursive behaviors.

Furthermore, it is possible to execute the same calling ROM subroutine from the EEPROM subroutines, thus avoiding the need to reproduce the same ROM instructions even in the EEPROM. In other words, in most of the cases an EEPROM subroutine just needs to contain integrative instructions without replacing the ROM instructions in their entirely to fix the behaviors of the calling ROM subroutine.

In more detail, the data and the subroutine are structured into the memory portions 2, 3 and 5 as follows. In the read only memory 2, there are subroutines called application code which are required to be patched (or to be extended). They contain some instructions predisposed for the patching mechanism according to which it is possible to call, indirectly, a patch (or extension) resident into non-volatile memory.

In the extended non-volatile memory portion 3, there are subroutines called application patch code which are required for providing new instructions to the application code. These subroutines may be used to fix improper functioning of the ROM application code.

In the additional read/write volatile memory portion 5, for each application patch code is present information (called a flag) that keeps the status of its execution. The flag may assume two types of values: free or busy (green or red, respectively).

To define the invention, an interaction mechanism between all the mentioned software modules is provided. The patching mechanism starts from the software module that requires to be patched (or to be extended), therefore, from the application code (ROM). At this stage, before executing the application code instructions, a checking phase about the presence of the correspondent application patch code is performed.

When the application patch code is not present, then nothing occurs and the execution proceeds with the instructions of ROM application code. On the contrary, if the application patch code is present, the application code checks for the status of the associated application patch code flag 4, and when the flag is free, the latter is set to a different logic value, for instance a value corresponding to an information busy or red state.

As a last step, the application code invokes the corresponding application patch code located in non-volatile memory. The patching mechanism terminates when the flag is reset to free (or green) by the application code, right after the application patch code instructions have been completely executed.

Everything described below is applicable to any subroutine, software module or group of CPU instructions. The flag is binary information associated to each subroutine that uses the patching mechanism. Therefore, there will be as many flags as the number of patchable subroutines. In any case, the mechanism is generic.

The ROM subroutine is a generic term referring to instructions resident in a generic read only memory (like ROM). The EEPROM subroutine is a generic term referring to instructions resident in a generic non-volatile memory (like EEPROM).

With specific reference to the example of FIG. 3, the invention may be disclosed as the software module to be patched would be a ROM subroutine. In this respect the initial status of the inventive method starts from the phase indicated with (0). Since the ROM subroutine is conditioned by the status of the flag 4, two scenarios are delineated. One with the flag green and the other with the flag red.

In more detail, when the ROM subroutine starts (0) with a green flag (initial status), the following actions are taken. The ROM subroutine gets information about the presence of the EEPROM subroutine (1). If the EEPROM subroutine is not present, then the ROM subroutine proceeds with the normal execution of ROM instructions (9) until the end of subroutine (11).

In the case of the EEPROM subroutine being present, the following are performed. The ROM subroutine checks the status of the flag. If the flag is red then the ROM subroutine proceeds with the normal execution of ROM instructions (9) until the end of subroutine (10) by passing for the return of the control of the ROM subroutine (7) and finally for resetting the flag to the green status (8).

For a green flag, the following are performed. The ROM subroutine sets the flag to a red status (3). The ROM subroutine calls the EEPROM subroutine (4). The EEPROM subroutine instructions are executed (5), and the EEPROM subroutine calls the calling ROM subroutine (0). In this case the EEPROM subroutine reuses the ROM instructions. This step could be processed even before EEPROM instructions are executed (5) or both, that is, before and after step (5). The EEPROM subroutine returns the control to ROM subroutine (7), and the ROM subroutine sets the flag to a green status (8), and the ROM subroutine ends its execution (11).

As may be appreciated by the above disclosure of the invention, a new or different patching of the subroutines of a specific application may be programmed according to the present invention by a straightforward definition of a predetermined number of flags that allow addressing and calling back subroutines of the extended memory portion without altering the main read only memory portion.

That which is claimed is:

1. A method for patching read only memory (ROM) instructions in an electronic system comprising a first non-volatile memory portion storing instruction groups defining patching functionalities, an extended memory portion storing extended instructions, and an additional memory portion, the method comprising:
checking a flag stored in the additional memory portion, the flag indicating a need for executing the extended instructions in the extended memory portion; and
alternating processing of the ROM instructions in the first non-volatile memory portion and the extended instructions in the extended memory portion based upon the flag;
the flag representing binary information associated to a subroutine to indicate whether the subroutine is in one of a free state and a busy state, the subroutine using patching mechanism defined by the ROM instructions, with each patching mechanism having a respective flag associated therewith.

2. A method according to claim 1 wherein the electronic system comprises a processor.

3. A method according to claim 1 wherein the first non-volatile memory portion comprises a read only memory.

4. A method according to claim 1 wherein the instruction groups comprise at least one of subroutines and software modules.

5. A method according to claim 1 wherein the additional memory portion comprises a volatile memory.

6. A method according to claim 5 wherein the volatile memory comprises a RAM.

7. A method according to claim 1 wherein the additional memory portion comprises a non-volatile memory.

8. A method according to claim 7 wherein the nonvolatile memory providing the additional memory portion comprises at least one of an EPROM, an EEPROM and a FLASH memory.

9. A method according to claim 1 wherein the ROM instructions in the first non-volatile memory portion define a calling ROM based subroutine; and wherein the extended instructions in the extended memory portion reuses the calling ROM based subroutine without resulting in recursive actions.

10. A method according to claim 1 wherein the ROM instructions in the first nonvolatile memory portion define a calling ROM based subroutine; and wherein the calling ROM based subroutine is executed during execution of the extended instructions in the extended memory portion.

11. A method according to claim 1 wherein the ROM instructions in the first nonvolatile memory portion define a calling ROM based subroutine; and wherein the extended instructions include integrative instructions completing actions of the calling ROM based subroutine.

12. A method according to claim 1 wherein the first non-volatile memory portion comprises an electrically erasable and rewritable memory.

13. A method for patching ROM instructions in an electronic system comprising:
storing ROM instructions defining patching functionalities of the electronic system in a read only memory;
storing extended instructions with respect to the read only memory in an extended non-volatile memory;
storing flags in an additional memory for indicating a change in the ROM instructions or the extended instructions being executed; and
alternating processing of the ROM instructions in the read only memory and the extended instructions in the extended non-volatile memory based upon a logic value of the flags;
the flags representing binary information associated to a subroutine to indicate whether the subroutine is in one of a free state and a busy state, the subroutine using a patching mechanism defined by the ROM instructions, with each patching mechanism having a respective flag associated therewith.

14. A method according to claim 13 wherein the additional memory comprises a volatile memory.

15. A method according to claim 13 wherein the additional memory comprises a nonvolatile memory.

16. A method according to claim 13 wherein the flags indicate whether the ROM instructions in the read only memory or the extended instructions in the extended non-volatile memory are to be executed.

17. A method according to claim 13 wherein the ROM instructions in the read only memory define a calling ROM based subroutine; and wherein the extended instructions in the extended non-volatile memory reuses the calling ROM based subroutine without resulting in recursive actions.

18. A method according to claim 13 wherein the ROM instructions in the read only memory define a calling ROM based subroutine; and wherein the calling ROM based subroutine is executed during execution of the extended instructions in the extended non-volatile memory.

19. A method according to claim 13 wherein the ROM instructions in the read only memory define a calling ROM based subroutine; and wherein the extended instructions comprise integrative instructions completing actions of the calling ROM based subroutine.

20. An electronic system comprising:
a read only memory for storing ROM instructions defining patching functionalities of the electronic system;
an extended non-volatile memory for storing extended instructions with respect to said read only memory;
an additional memory for storing flags indicating a change in the instructions being executed; and
a processor connected to said read only memory, said extended non-volatile memory and said additional memory, said processor alternating processing of the ROM instructions in said read only memory and the extended instructions in said extended non-volatile memory based upon the flags;
the flags representing binary information associated to a subroutine to indicate whether the subroutine is in one of a free state and a busy state, the subroutine using patching defined by the ROM instructions, with each patching mechanism having a respective flag associated therewith.

21. An electronic system according to claim 20 wherein said additional memory comprises a volatile memory.

22. An electronic system according to claim 20 wherein said additional memory comprises a non-volatile memory.

23. An electronic system according to claim 20 wherein the flags indicate whether the ROM instructions in said read only memory or the extended instructions in said extended non-volatile memory are to be executed.

24. An electronic system according to claim 20 wherein the ROM instructions in said read only memory define a calling ROM based subroutine; and wherein the extended instructions in said extended non-volatile memory reuses the calling ROM based subroutine without resulting in recursive actions.

25. An electronic system according to claim 20 wherein the ROM instructions in said read only memory define a calling ROM based subroutine; and wherein the calling ROM based subroutine is executed during execution of the extended instructions in said extended non-volatile memory.

26. An electronic system according to claim 20 wherein the ROM instructions in said read only memory define a calling ROM based subroutine; and wherein the extended instructions comprise integrative instructions completing actions of the calling ROM based subroutine.

* * * * *